United States Patent [19]
Kingsbury et al.

[11] Patent Number: 6,049,853
[45] Date of Patent: Apr. 11, 2000

[54] DATA REPLICATION ACROSS NODES OF A MULTIPROCESSOR COMPUTER SYSTEM

[75] Inventors: Brent A. Kingsbury; Corene Casper, both of Beaverton; Phillip E. Krueger, Lake Oswego, all of Oreg.

[73] Assignee: Sequent Computer Systems, Inc., Beaverton, Oreg.

[21] Appl. No.: 08/920,477

[22] Filed: Aug. 29, 1997

[51] Int. Cl.[7] .................................................. G06F 12/00
[52] U.S. Cl. ........................ 711/147; 709/213; 709/216
[58] Field of Search ........................... 711/147; 709/213, 709/216

[56] References Cited

U.S. PATENT DOCUMENTS

| | | |
|---|---|---|
| 5,109,336 | 4/1992 | Guenther et al. . |
| 5,193,202 | 3/1993 | Jackson et al. . |
| 5,237,673 | 8/1993 | Orbits et al. . |
| 5,784,697 | 7/1998 | Funk et al. . |
| 5,860,104 | 1/1999 | Hagerston et al. . |

OTHER PUBLICATIONS

Larowe, Jr. and Ellis, "Experimental comparison of Memory Management Policies for NUMA Multiprocessors," *ACM Transactions on Computer Systems*, vol. 9, No. 4, pp. 319–363 (1991).

*Primary Examiner*—Jack A. Lane
*Attorney, Agent, or Firm*—Klarquist Sparkman Campbell Leigh & Whinston, LLP

[57] ABSTRACT

For a multiprocessor computer having shared memory distributed across multiple nodes, a method and system for dynamically replicating data such as program text stored in memory on a first node to memory on a second node for use by a process executing on the second node. In response to a page fault generated by the process in accessing data, a determination is made whether the data is present in the memory of another node. If so, memory is allocated on the process's node for the data, and the needed data is copied from the other node to the process's node. The process's page table entry for the missing data is then modified to contain the physical address of the allocated memory, where the data is now stored. The method is implemented in a preferred embodiment by using novel data structures linked to the data structures that are typically created when a file is mapped to a process's virtual address space.

20 Claims, 8 Drawing Sheets

DATA REPLICATION ACROSS NODES OF A MULTIPROCESSOR COMPUTER SYSTEM

FIELD OF THE INVENTION

This invention relates generally to multiprocessor computers having shared memory distributed among a network of multiple nodes. More particularly, this invention relates to a method and apparatus for dynamically replicating in memory data such as information or program text (i.e., executable code) from a first node to a second node in response to the need of a process on the second node for the text. By replicating in memory the data on the second node rather than requiring the process to access it from the first node across the networked memory interconnect, the invention greatly reduces the process's execution time and thereby increases the performance of the computer.

BACKGROUND OF THE INVENTION

Multiprocessor computers by definition contain multiple processors that can execute multiple parts of a computer program and/or multiple distinct programs simultaneously, in a manner known as parallel computing. In general, multiprocessor computers execute multithreaded-programs and/or single-threaded programs faster than conventional single processor computers, such as personal computers (PCs), that must execute programs sequentially. The actual performance advantage is a function of a number of factors, including the degree to which parts of a multithreaded-program and/or multiple distinct programs can be executed in parallel and the architecture of the particular multiprocessor computer at hand.

Multiprocessor computers may be classified by how they share information among the processors. Shared-memory multiprocessor computers offer a common physical memory address space that all processors can access. Multiple processes and/or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared-memory multiprocessor computers may further be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared memory systems are often called non-uniform memory access (NUMA) machines. By contrast, in centralized shared-memory computers, the memory is physically in one location. Centralized shared-memory computers are called uniform memory access (UMA) machines because the memory is equidistant in time from each of the processors. Both forms of memory organization typically use high-speed cache memory in conjunction with main memory to reduce execution time.

Multiprocessor computers with distributed shared memory are often organized into multiple nodes with one or more processors per node. The nodes interface with each other through a memory-interconnect network by using a protocol, such as the protocol described in the Scalable Coherent Interface (SCI)(IEEE 1596). UMA machines typically use a bus for interconnecting all of the processors.

Further information on multiprocessor computer systems in general and NUMA machines in particular can be found in a number of works including *Computer Architecture: A Quantitative Approach* (2nd Ed. 1996), by D. Patterson and J. Hennessy, which is hereby incorporated by reference.

NUMA machines offer significant advantages over UMA machines in terms of bandwidth, but they have the drawback of increased delay when a processor on one node, in executing a process (a part of a computer program) must access memory on a remote node. This situation may arise when data such as program text (the actual machine instructions being executed) required by the process is stored in memory on the remote node. While accessing the instructions from the remote memory is expensive, it is still far faster than re-reading the required text in from the file system on secondary storage. Conversely, the remote memory access to the required instructions is far from ideal, as accessing remote memory is considerably slower than accessing memory locally on the node. Such remote memory references significantly reduce the speed of the process's execution.

A simple solution to this problem is to copy all of the required data (such as all of the executable code of a program) into the memory on each node in advance of execution. But this approach is impractical in most circumstances because the file may consume too much of the node's memory and much of the data, if program text, may never be executed on one or more of the system nodes.

An objective of the invention, therefore, is to provide a method and system for dynamically copying a file part or portion (the terms considered equivalent herein) such as program text stored in memory on a first node to memory on a second node for use by a process running on the second node. Another objective is to provide such a method and system that copies upon demand only the portions of the file needed by the process, thus avoiding the unnecessary displacement of other data present in memory on the second node.

SUMMARY OF THE INVENTION

A method according to the invention replicates data such as a program text stored on a first node of a multiprocessor computer to a second node for use by a process executing on the second node.

In a preferred embodiment of the invention, the method is invoked in response to a signal such as a fault generated by the process on the second node in accessing data. The method determines whether the data is present in memory on the first node. If so, memory is allocated for the page on the second node, and the data is copied from the memory on the first node to the allocated memory on the second node.

In a preferred embodiment of the invention, the determination of whether or not the missing data is stored in the memory of the first node is made by examining a data structure associated with the first node, the data structure having fields or elements (the terms considered equivalent herein) that describe where pages of the file comprising the data are stored on the first node. This data structure may be a second of two data structures stored in memory and accessible by all processes executing on the multiple nodes. The first data structure has an element for each of the multiple nodes indicating whether any page of the file is present in the memory of the first node. The second data structure referred to by the first data structure, such as through a pointer, describes which of the pages of the file are present in memory on the first node. The operating system, in determining whether the missing page is present in the memory of another node, examines the fields of the first data structure to find second data structures that contain a physical address for the missing page (if a copy of the missing page resides on that node). If found therein, memory is then allocated on the second node and the page is copied from the node where the page resides (a first node) to the process's node (a second node).

In accordance with the invention, data such as program text is replicated to a process's node from other nodes to reduce access time to that text. Moreover, the replication is dynamic and selective so that only needed text is copied, and copied only when needed. Duplication of code in the memory of each node is minimized to reduce memory requirements while process execution speed is increased by reducing the process's need to communicate with another node.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

System Overview

Figure 1:
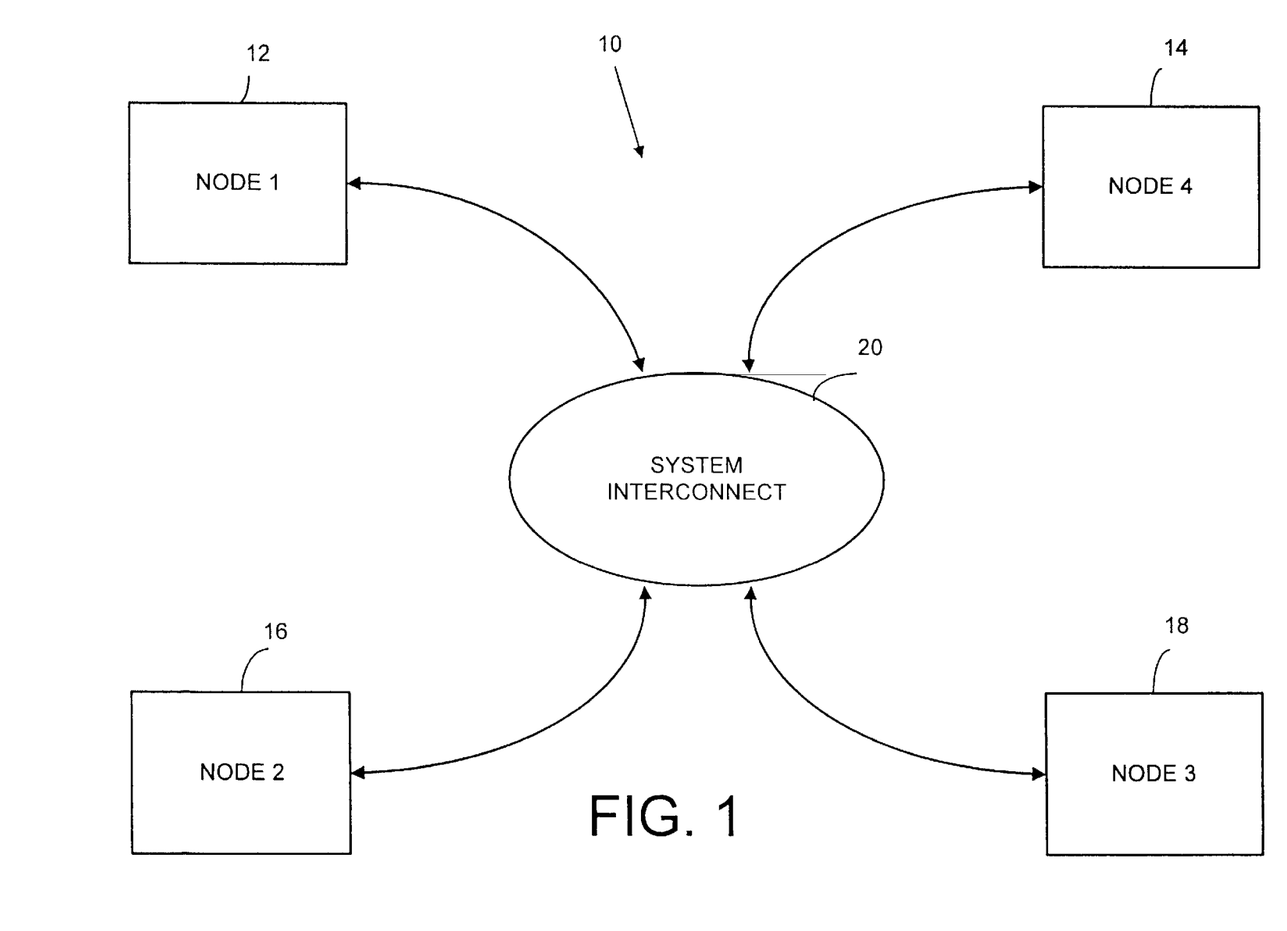
FIG. 1 is a block diagram of a multinode multiprocessor computer system with a system interconnect coupling the nodes together.

FIG. 1 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12, 14, 16, and 18 are shown connected by a system interconnect 20 (i.e., a network) that permits any node to communicate with any other node. Specifically, the purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including IEEE Std 1596–1992 (Aug. 2, 1993) and *Multiprocessor Interconnection Using SCI,* a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12, 14, 16, and 18 such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin—Madison, which is hereby incorporated by reference.

Node Overview

Figure 2:
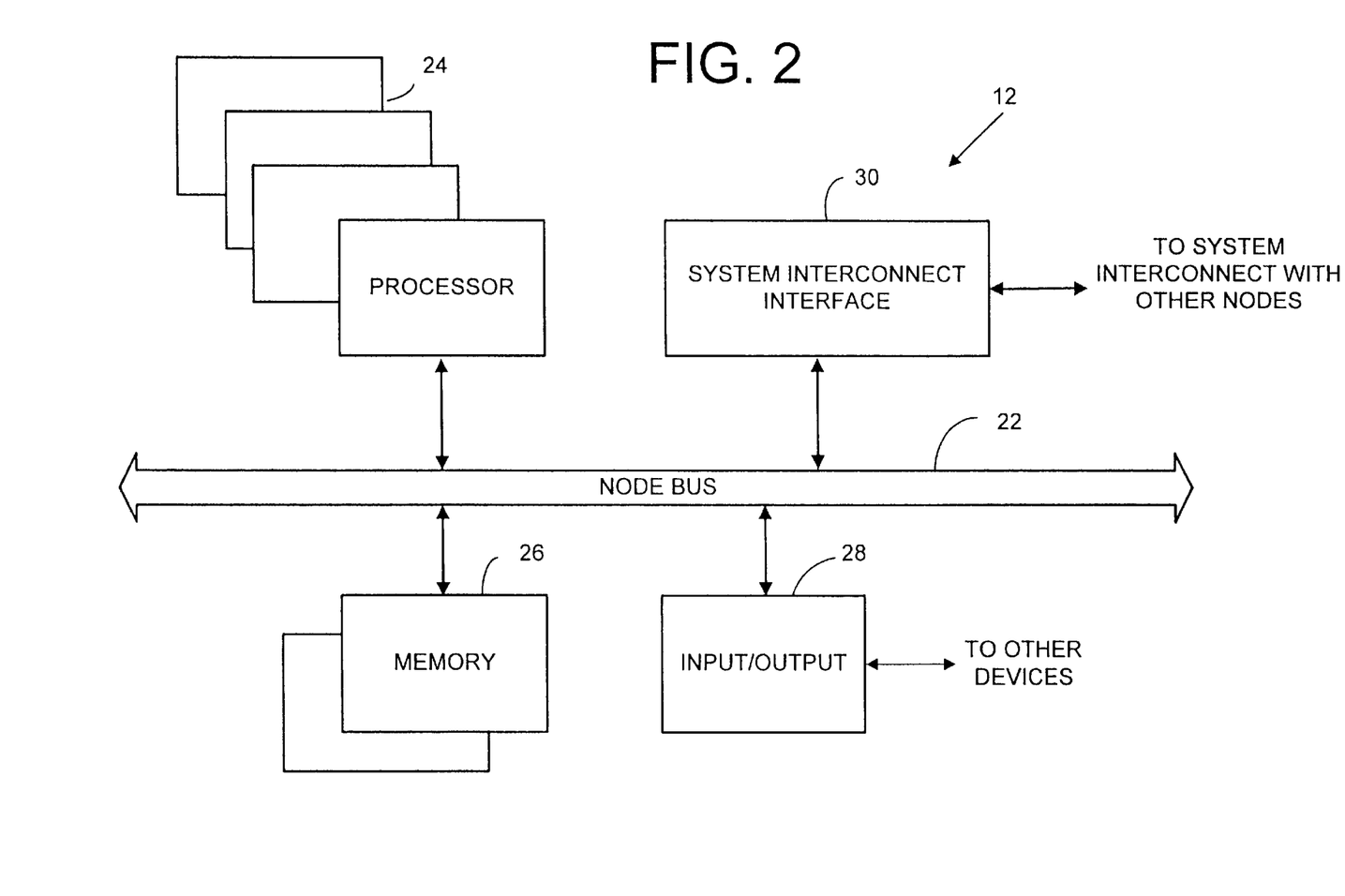
FIG. 2 is a block diagram of one of the nodes of the computer system of FIG. 1.

A block diagram of node 12 on system 10 is shown in FIG. 2. The node includes a conventional symmetrical multiprocessor (SMP) node bus 22 for connecting multiple data processors 24 to local memory 26. For clarity, nodes 12, 14, 16, and 18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to directly access data stored on another node. The interface 30 also contains a remote cache in the present embodiment, although this combination is not required for the invention. The remote cache could also be separate from the system interconnect interface.

Operating System Overview

Figure 3:
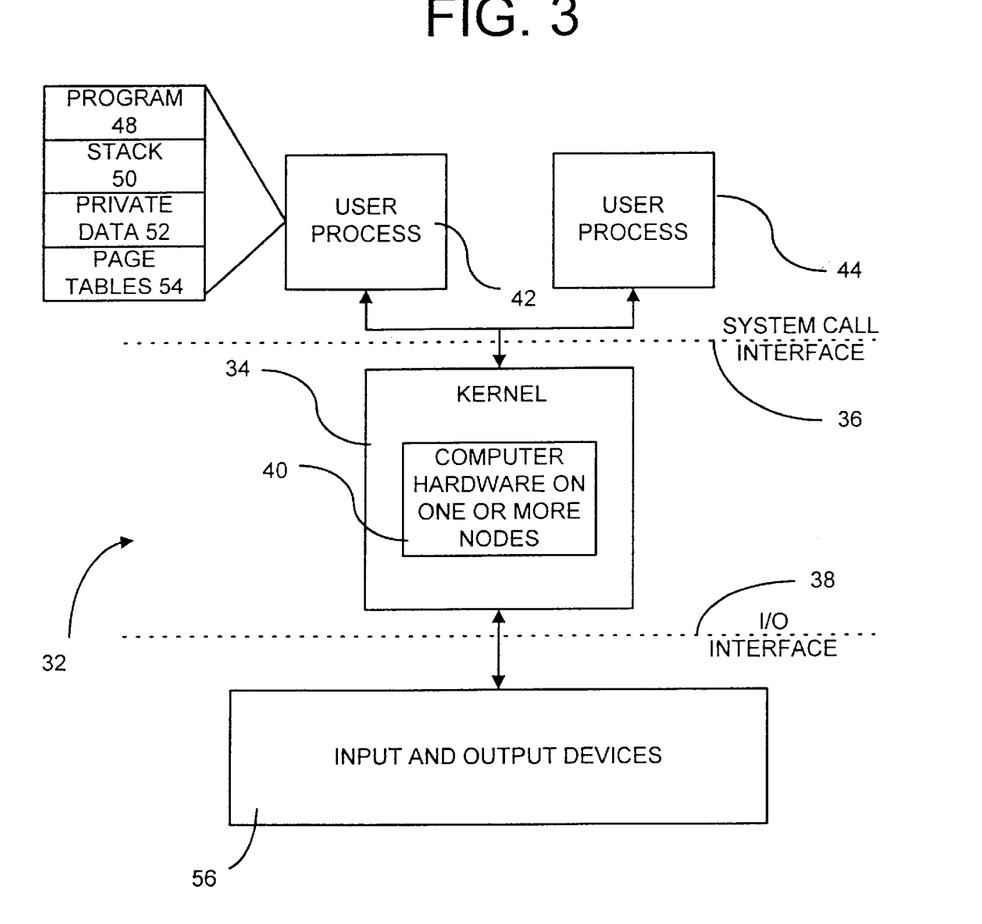
FIG. 3 is a block diagram of how an operating system for the system of FIG. 1 operates with user processes and input and output devices.

FIG. 3 shows an operating system 32 for computer system 10, which includes a kernel 34, a system call interface 36 and an I/O interface 38. The same operating system environment exists on the other nodes. The illustrated operating system is a UNIX-based operating system, such as DYNIX/ptx, BSD, SVR3, UnixWare, PC UNIX, etc. Other UNIX-based operating systems or other operating systems generally may also be used. For general information on UNIX-based operating systems, see Bach, M. J., *The Design of the UNIX Operating System,* Prentice-Hall, 1986; Vahalia, U., *Unix Internals: The New Frontier,* Prentice-Hall, 1996; McKusick, M., et al., *The Design and Implementation of the 4.4 BSD Operating System,* Addison-Wesley, 1996, which are all hereby incorporated by reference. Kernel 34 (which is the heart of operating system 32) is a program stored in memory 26 on one or more nodes. Memory 26, processors 24, and other hardware shown in FIG. 2 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CD ROM, etc.), a shared memory segment, a file, a process, a processor, etc.

User requests are generated by one or more user processes 42 and 44 that run on system 10. User process 42 includes a part of a program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single and multi-level page tables are represented by page table 54. Process 44 includes a similar environment to that of process 42. Although two user processes are shown, any number of processes may be run at one time on the node. The user processes make requests to kernel 34 through system calls which are passed to the kernel by system call interface 36. Processes execute in parallel to the extent they can be run concurrently on the different processors of system 10.

Kernel 34 accesses I/O devices 56 through I/O interface 38. For example, if user process 42 requests information from a disk drive (not shown) included within I/O devices 56, user process 42 makes a system call to operating system 32. Operating system 32 uses I/O interface 38 to retrieve the information from the disk drive and returns the information to user process 42.

Operating system 32 provides several system calls to create and terminate processes and to execute programs. For example, in UNIX, the fork system call creates a new process and the exec system call executes a program. The fork system call is performed by a "parent" process. The new process that is created by the fork system call is a "child" process and is nearly an exact copy of the parent. Typically, the child process makes an exec system call shortly after the fork system call to instantiate and begin executing a program, such as program 48. The fork and exec system calls may respectively take a variety of forms, such as vfork and execv, execve, or execvp. Each form takes a slightly different set of arguments, but generally perform similar functions.

Figure 4:
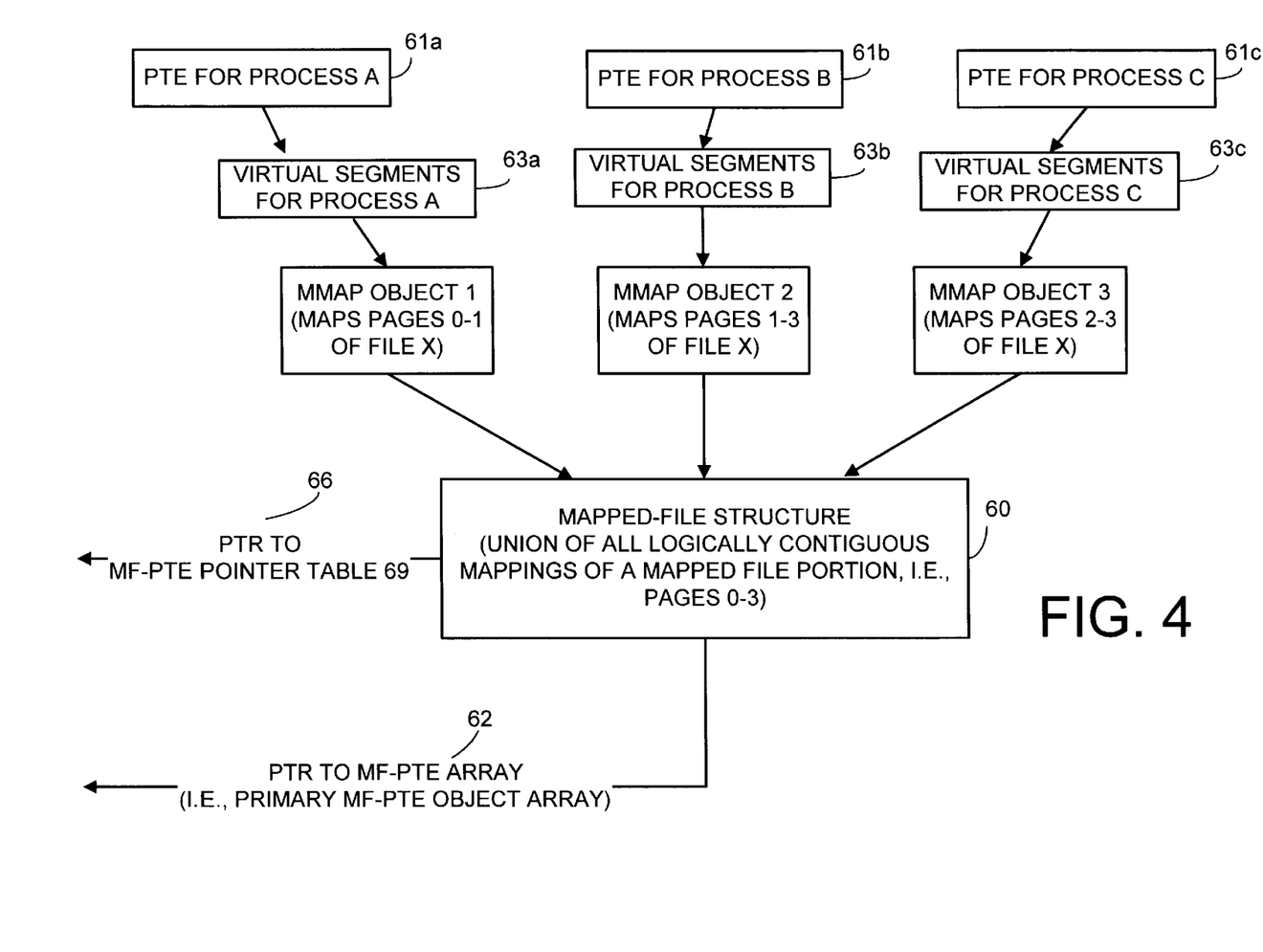
FIG. 4 is a block diagram of several data structures that are created in mapping a file into a process's virtual address space.

In executing part of a program, the exec system call maps program code from a file into the process's virtual address space by identifying the file, the file portion of interest, and the associated virtual address space. exec uses the same mapping technique as the mmap system call, which may also be used by processes to map a file into the process's virtual address space. The kernel creates this mapping by updating the memory management data structures that are shown in FIG. 4 and hereafter described. Once mapped, the exec system call logic sets the instruction pointer of the process to the appropriate starting virtual address and begins execution of the application program.

The mapping of a file into the virtual address space of a process allows all such processes, when accessing the same page of the same mapped file, to share access to the same physical page in memory. This physical page is a single copy of the corresponding page in the mapped file. Processes can access this single copy, rather than making separate copies of the same file page in separate physical pages of memory. Recall that upon creation of a process, its page table is initially empty, with no physical pages of memory associated with the process's virtual address pages. The first time a process such as process 42 attempts to access a page of a mapped file through the virtual address space, it generates a signal such as a page fault. The kernel 34 resolves the page fault by reading the page of the file from the file system (e.g., disk) into memory and updating the process's page table to point to the appropriate physical page. Subsequently, when process 44 faults on the file page, the page is already in memory. The kernel merely change's the appropriate page table entry for process 44 to point to it after consulting the memory management data structures to determine the physical address of the needed file page.

While this mapping allows processes to efficiently share physical memory, it presents a problem in a NUMA machine because the memory is distributed across separate nodes. If processor 24 on node 12, for example, generates a process 42 that is using physical memory 26 on the node, the file pages mapped by the process will be stored in memory 26. If a process 44 on node 14 then maps the same file page into its virtual address space, its page table will contain the physical address of the file page in memory on node 12. Each time process 44 accesses the mapped file page on node 12, it must communicate with node 12's memory across system interconnect 20. This communication can considerably delay the execution of process 44 if the number of file pages mapped by process 44 is significant.

The Data Structures for Replicating Text

FIG. 4 is an example of several data structures that are created and stored in memory when mapping a file into a process's virtual address space. The file mapping by a process is accomplished via a system call that creates a kernel data structure known as an mmap object for each process that maps the file. This object identifies which portions of the file (such as pages in this embodiment) are mapped into the virtual address space of one or more processes. For example, the operating system, in response to a call by process A, creates mmap object 1 to map the first two pages of a file X into process A's virtual address space. Similarly, in response to calls from processes B and C, the operating system creates other mmap objects 2 and 3 for the same or other file pages of file X. These mmap objects are referenced by the page tables 61*a*, 61*b*, and 61*c* and virtual segments 63*a*, 63*b*, and 63*c* of these processes. (The address space of each process is divided into virtual segments. Each virtual segment object describes the beginning and ending virtual address for the segment. Furthermore, If one or more pages within the segment are mapped, then the virtual segment object indicates which mmap object describes the mapping.) On a page fault by the process, the operating system can find the relevant mmap object to identify the missing file page and eventually update the appropriate page table entry (PTE) with the physical address of the in-memory copy of the required file page.

The mmap object for each mapping of a file or file portion by a process, in turn, points to a mapped file structure 60, describing the union of all logically contiguous mappings against the file or file portion. In the example of FIG. 4, the logically contiguous mappings are of file pages 0 through 3, and structure 60 represents the union of these mappings. Other mapped file structures may include other contiguous file pages such as pages 6 through 12, etc. Within structure 60 are two pointers of particular relevance to the invention. A first pointer 62 points to an MF-PTE (mfile-page table entry) array that contains an element for each of the pages in the union. (MF-PTEs are distinguished from PTEs, which are page table entries. PTEs are accessed by the memory management unit (MMU) of the processor when translating from a virtual to a physical address. MF-PTEs are never accessed by the MMU of the processor. They are data structures that exist for the operating system to manage the state of the mapped pages.) Each of the elements (MF-PTEs) of the MF-PTE array contains an address where the file page may be found. If the page is already stored in memory because, perhaps, one of the processes A, B, or C has already used it, then the physical address for the page is contained in the element for that page. If the page has not yet been stored in memory, then the secondary storage (e.g., file system) address for the page is contained in the element for the page: In the case of an ordinary file mapping, these data structures completely implement the file mapping and the MF-PTE array 64 is typically a separate array pointed to pointer 62.

Figure 5A:
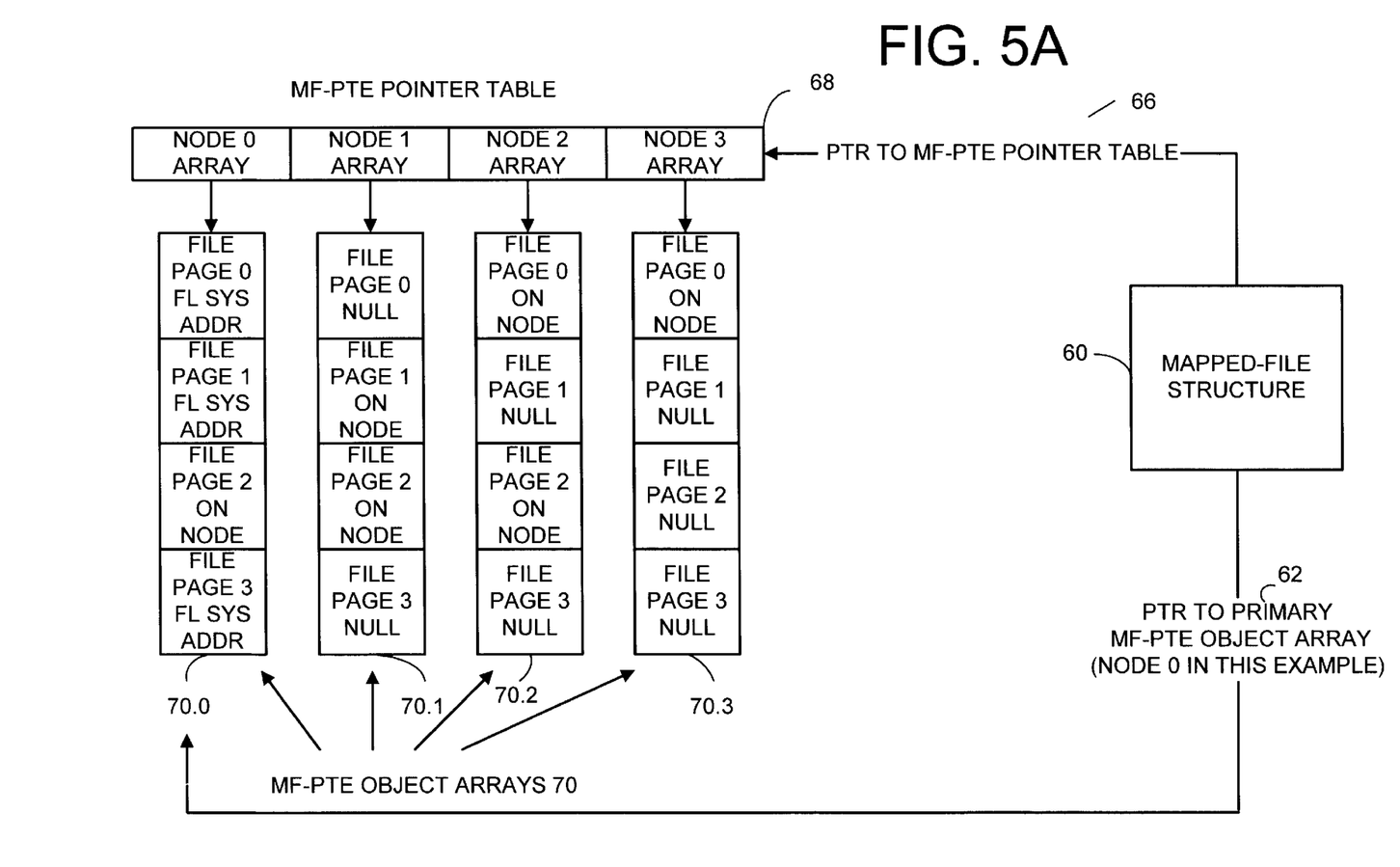
FIG. 5A is a block diagram showing a first state of several data structures that are linked to the data structures of FIG. 4 and are used in carrying out the method of the invention.

In the case of a replicated data mapping to which the preferred embodiment applies, however, the MF-PTE array is established as part of another data structure when a process first attempts to map a file page of structure 60. Referring to FIG. 5A, this other data structure is one of the MF-PTE object arrays 70 shown therein. More specifically, the MF-PTE array is the first established, or primary, MF-PTE object array 70. In the example of FIG. 5A, MF-PTE object array 70.0 is the primary object array and functions as both an MF-PTE array and an MF-PTE object array in a manner to be described. Additional MF-PTE object arrays are created dynamically for each node in system 10 to allow the tracking of multiple in-memory copies (up to one per node) of each particular file page that is mapped.

Figure 5B:
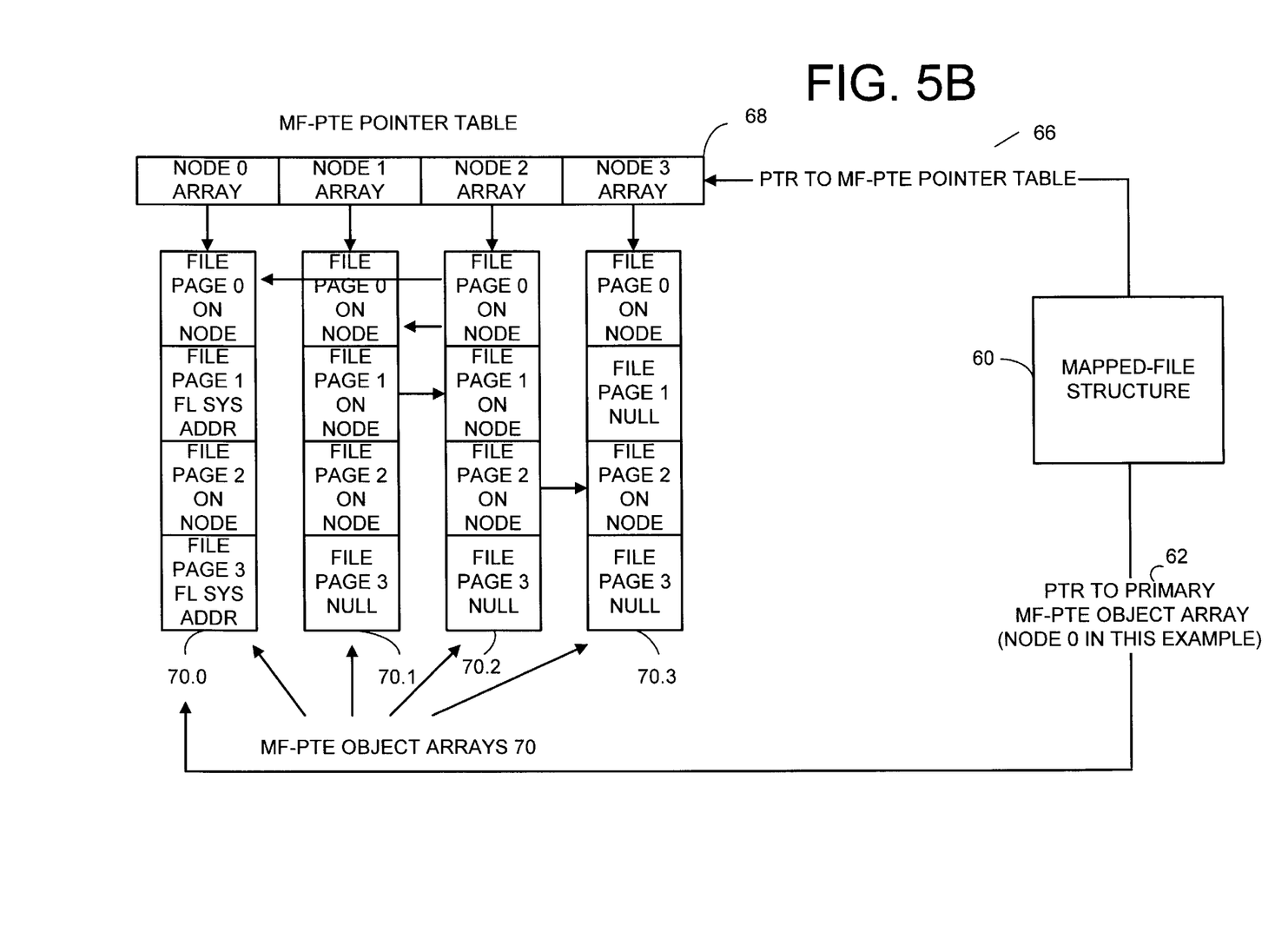
FIG. 5B is a block diagram showing a second state of the data structures of FIG. 4.

FIG. 5B also includes a second data structure, the MF-PTE pointer table 68, referenced by pointer 66 for the mapped file structure 60. Table 68 is a data structure such as an array that contains a number of elements. Each element corresponds to a different node of system 10, and contains a pointer which, if not null, points to the MF-PTE object array for the corresponding node (these are shown as the MF-PTE object arrays 70.0, 70.1. 70.2, and 70.3 in FIG. 5A).

The MF-PTE object array 70.x (where x is the node number) for a node contains an element for each file page in the union represented by structure 60 (e.g., pages 0–3). MF-PTE object array 70.x is identical (except for the content) to the MF-PTE array in that each element refers to a page of the union. The MF-PTE object array for each node provides the physical address of each page whenever the page is present in the memory of the node. If the page is not present in the memory of the array's node, the corresponding entry in the node's MF-PTE object array is marked as null. In addition, the primary MF-PTE object array (array 70.0 in the example of FIG. 5A) maintains the file system address of each mapped page of the file, when each such page is not present in the memory of any node of system 10. When a page of the file described by structure 60 becomes resident in the memory of the node of the primary MF-PTE object array, then the corresponding MF-PTE element is modified to store the physical address of the page. The file system address of the page is then stored in another kernel data structure reserved for this purpose in the event that all nodes eventually discard the page and need to reload it later upon a subsequent reference to the same page.

These various data structures are created dynamically in memory as needed and are globally accessible to processes running on any of the system's nodes. The mapped file data structure 60 is created upon the mapping of a file or portion thereof. It, in turn, creates MF-PTE pointer table 68 which is initially filled with null pointers.

When a process first attempts to store a page of the mapped file on the process's node, the primary MF-PTE object array 70.x is established on that node and the node pointer in table 68 is changed from null to the address of the MF-PTE object array. In the example of FIG. 5A. The first process that attempted to store a page of mapped file X happened to be on node 0, and thus MF-PTE object array 70.0 is the primary object array. As other processes attempt to store a page of the mapped file on their nodes, additional (non-primary) MF-PTE object arrays 70.x for these nodes are created and the appropriate pointers in table 68 are changed to point to these arrays.

Alternatively, a separate MF-PTE array can be established that does not occupy the same array as an MF-PTE object array 70. In this second embodiment, there is no primary MF-PTE object array.

The Method for Replicating Text

The method of the invention includes replicating a file portion, such as program text, stored in memory on a first node to memory on a second node for use by a process executing on the second node. By doing so, the process on the second node does not have to continually access memory on the first node to read the program text. The method is preferred for replicating program text that is executable and read-only. It may, of course, also be used for replicating any part of a file if desired.

Figure 6:
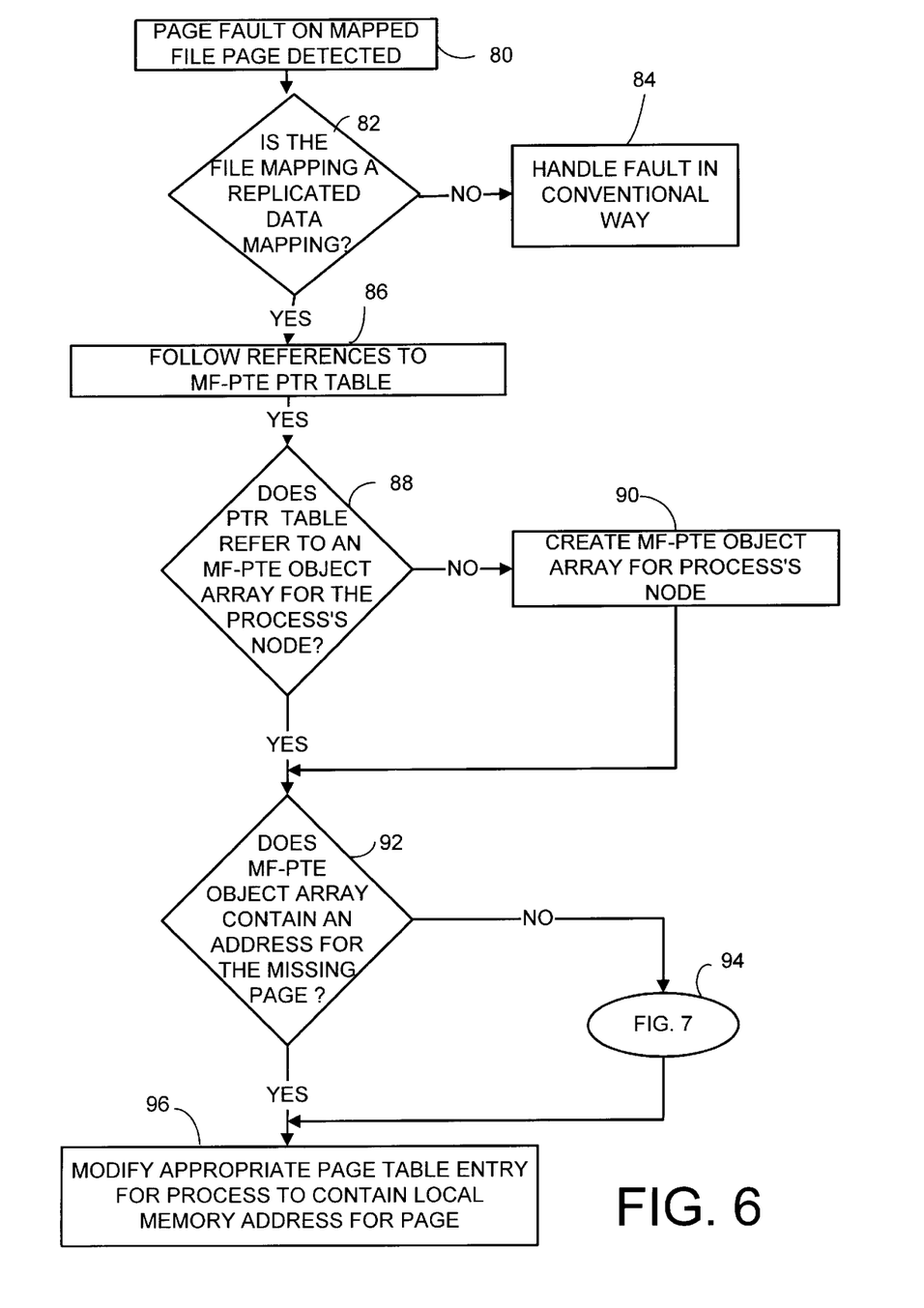
FIG. 6 is a first flow chart of a method according to the invention for replicating text across nodes of a multiprocessor computer system.

FIG. 6 is a flow chart of the general method for responding to a fault, of which the method of replicating text is a part. At this point in the method, it is assumed that the data structures of FIG. 4 and table 68 and the primary MF-PTE object array 70 of FIG. 5A exist because of a mapping of file X. Continuing with the example in the figures, the primary MF-PTE object array is array 70.0.

Initially, the method is invoked upon detection of a signal by a process such as a page fault on a mapped file page(step 80). In response to the page fault, the operating system checks to determine if the file mapping is from a replicated data mapping (step 82). If the mapped file is not a data replicating mapping, then the operating system handles the fault in a conventional way (step 84).

Figure 7:
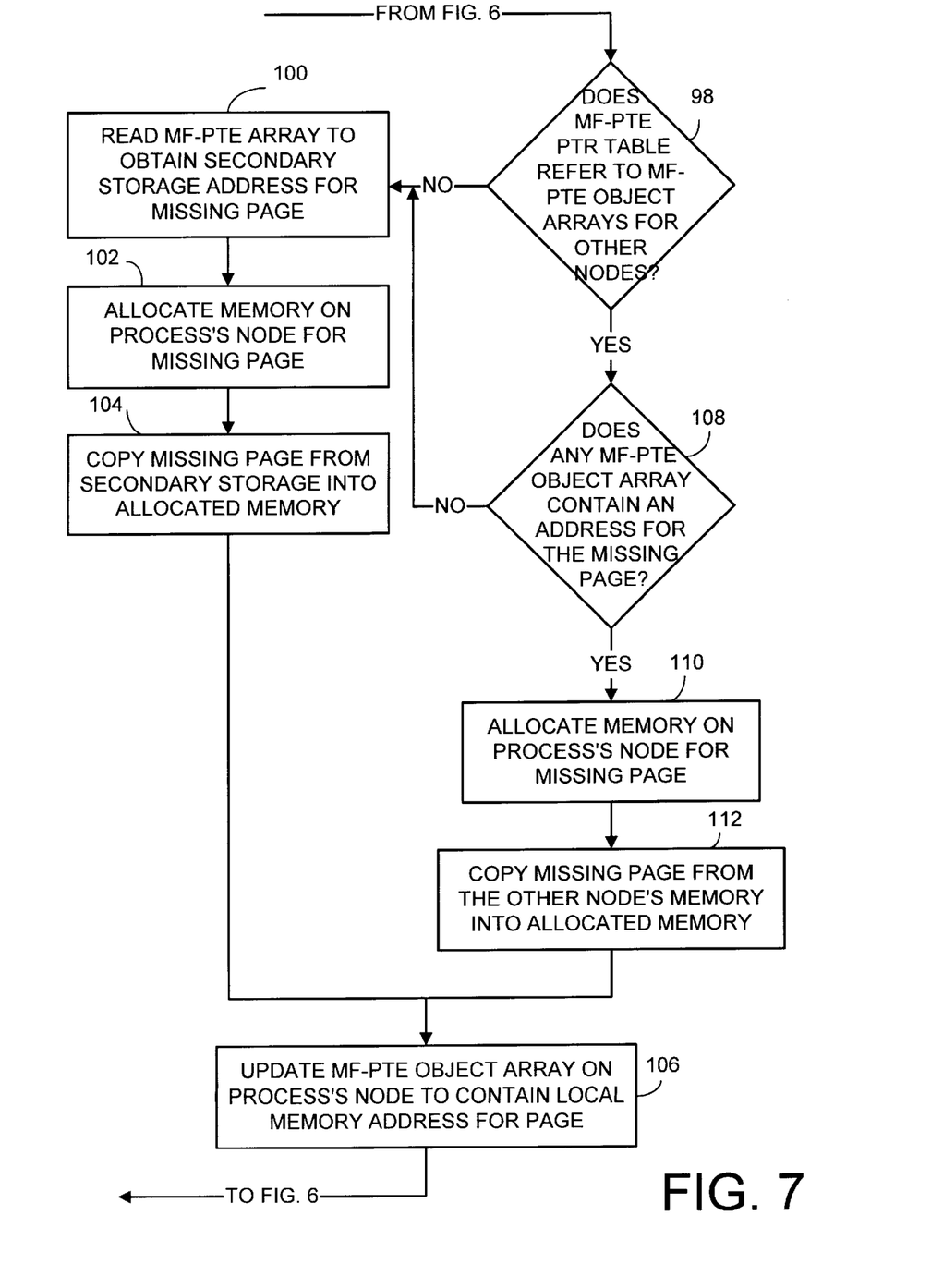
FIG. 7 is a second flow chart of a method according to the invention for replicating text across nodes of a multiprocessor computer system.

However, if the missing page is a replicated data mapping, then the operating system follows the references (pointers in this embodiment) from the virtual segment within which the fault occurred to the related mmap object and mapped-file structure 60 and through pointer 66 to MF-PTE pointer table 68 (step 86). It then checks to see if table 68 refers to an MF-PTE object array 70.x for the process's node (step 88). If no object array 70.x yet exists for the process's node, then an object array 70.x is created for the node (step 90). Null values are entered into each of the newly created object array's elements because none of the corresponding file pages are yet stored in memory on the array's node. If an object array 70.x does exist for the node, then the element corresponding to the missing page is checked to see if it contains a local physical memory address for the page (step 92). If no local memory address is present, then the steps of FIG. 7 are followed to determine whether the page is present in memory on another node (step 94). If a local memory address is present (from another process on this node already having mapped the file page into this node's memory), then the page need not be replicated. Instead, the appropriate page table entry for this process is simply modified to contain the local node's memory address for the page (step 96).

The example in FIG. 5A illustrates how the method works up to this point. MF-PTE object arrays 70 already exist for each of the nodes 0, 1, 2, and 3 for the mapped file X, indicating that processes which map this file have been executing on these nodes. The object arrays 70 describe which of the mapped file pages are present in their node's memory. For the primary MF-PTE object array 70.0, the references to FL SYS ADDR (file system address) in the 0th, 1st and 3rd elements of object array 70.0 give the file system addresses and also indicate that the corresponding file pages 0, 1 and 3 of file X are not present in node 0's memory. This file system address is used by processes whenever a file page must be retrieved from the file system. The references to ON NODE in the 2nd element indicates that file page 2 is stored in node 0's memory. For object array 70.1, the references to NULL in the 0th and 3rd elements of array 70.1 indicate that file pages 0 and 3 are not presently in node 1's memory (and by implication must be obtained from elsewhere). File pages 1 and 2, on the other hand, are indicated to be stored in node 1's memory. The elements of object arrays 70.2 and 70.3 similarly describe whether the corresponding file pages of file X are stored on nodes 2 and 3 or must be obtained from elsewhere.

FIG. 7 is a flow chart that shows steps for determining if the needed file page is present in memory on another node and, if so, how to replicate it from the other node to the process's node and, if not, how to obtain it from the file system. Once the operating system has determined that the MF-PTE object array for the process's node lacks a physical memory address for the page, it checks the MF-PTE pointer table 68 to see if other PTE object arrays exist (step 98). If no other MF-PTE object arrays presently exist, then the needed file page, as included in the mapped file, is not presently in the memory of system 10. The operating system then follows pointer 62 from structure 60 to the primary MF-PTE array (which in this example is the MF-PTE object array 70.0) to obtain the file system address for the file page (step 100). The operating system then allocates memory on the process's node for the missing file page (step 102) and copies the missing file page from secondary storage into the allocated memory (step 104). It then updates the MF-PTE object array on the process's node to contain the new local memory address for the file page (step 106). With this update, the appropriate page table entry for the process can now be modified to contain the physical address (step 96).

Returning to step 98, assume that other MF-PTE object arrays already exist, as shown in the example of FIG. 5A. The operating system then checks the corresponding page element of these arrays to determine if any contains a local memory address of a copy of the missing file page (step 108). If yes, this indicates that the missing file page is already stored in memory of another node. If not, then the page must be obtained from the file system (secondary storage) as per steps 100–104. Assuming that at least one of the other object arrays contains a local memory address for the needed file page, the page is replicated to the process's node in the following manner. Memory is allocated conventionally for the page on the process's node from the list of free physical pages for the node (step 110). The text is then copied from memory on the node containing the needed page to the allocated memory on the process's node (step 112). The MF-PTE object array on the process's node is then updated (step 106) and the appropriate page table entry for the process is modified (step 96) to contain the local memory address for the file page.

FIGS. 5A and 5B illustrate steps 98–112 of FIG. 7. Assume that a process on node 2 needs a physical address for file page 1. In examining array 70.2, it is originally determined that file page 1 is not stored in memory on node 2 (FIG. 5A). The operating system then checks to see if any other nodes have an MF-PTE object array 70 (step 98). It determines that node 1 has such an array with the address of the needed file page stored therein (step 108). As shown in FIG. 5B, memory is therefore allocated (step 110) and the missing page is copied from node 1 to node 2, as indicated by the arrow between the two arrays 70.1 and 70.2, so that file page 1 is now "on node" 2.

FIG. 5B shows other examples of replicating text from a one node to another node, as indicated by the arrows between corresponding elements of the MF-PTE object arrays 70.0, 70.1, 70.2, and 70.3. The file system address stored in the $0^{th}$ element of node 0 is replaced with a local memory address because a process on node 0 obtained via the operating system a copy of file page 0 from node 2 for node 0. Similarly, the null value stored in the $0^{th}$ element of node 1 is replaced with a local memory address because a process on node 1 obtained a copy of file page 0 from node 2 for node 1. And the null value stored in the $2^{nd}$ element of node 3 is replaced with a local memory address because a process on node 3 obtained a copy of file page 2 from node 2 for node 3.

In the present embodiment, the file system address for a file page in an element of the primary MF-PTE object array is not replaced until a process on the primary object array's node stores the page on that node. If the page is stored by a process on another node, the file system address remains in the primary array element and is not changed to reflect this physical address. This situation is illustrated in FIG. 5A for file page 0. A process on node 2 read the file system address in the $0^{th}$ element of node 0 and retrieved the page from the file system. Thus the $0^{th}$ element of node 2 contains a local memory address, but the $0^{th}$ element of node 0 still contains the file system address. If desired, however, the information stored with the file system address in the primary array could reflect whether the file page is stored on another node.

Having illustrated and described the principles of the invention in a preferred embodiment, it should be apparent to those skilled in the art that the preferred embodiment can be modified in arrangement and detail without departing from such principles. For example, the method of the invention may be invoked in response to signals from a process other than a page fault. Many of the software aspects of the embodiment may be implemented in hardware and visa versa. The invention may be used with other multiprocessor computer systems, with memory interconnect interfaces other than SCI, and with memory management techniques other than pages. The data structure may have any of a number of equivalent forms, with the fields storing physical addresses or pointers to physical addresses. The invention may be used to replicate data other than pages from mapped files and to replicate file pages other than program text. In view of the many possible embodiments to which the principles of the invention may be applied, it should be recognized that the illustrated embodiment is only a preferred example of the invention and should not be taken as a limitation on the scope of the following claims.

We claim:

1. In a multiprocessor computer system having shared memory distributed among multiple nodes, a method of dynamically replicating data stored in memory on a first node to memory on a second node for use by a process executing on the second node, the method comprising the following steps:

in response to a signal generated by the process on the second node in accessing data, determining that the data is present in memory on the first node;

allocating memory for the data on the second node; and copying the data from memory on the first node to the allocated memory on the second node.

2. The method of claim 1 wherein the determining step comprises examining a field of a data structure stored in memory and associated with the first node to determine that the field describes a physical memory address on the first node for the data.

3. The method of claim 1 wherein the determining step comprises:

examining a field of a first data structure stored in memory to find a second data structure that pertains to the first node; and examining a field of the second data structure stored in memory to determine that the field describes a physical memory address for the data on the first node.

4. The method of claim 1 wherein the allocating step comprises selecting a physical page of memory from a free list of such pages for the second node.

5. The method of claim 1 wherein the copying step comprises copying the data from a physical page stored in memory of the first node to the allocated memory on the second node.

6. The method of claim 1 wherein the data is program text executable by the process.

7. A computer readable medium having stored therein instructions for executing the steps of claim 1.

8. In a multiprocessor computer having shared memory distributed among multiple nodes, a method of dynamically replicating a file page stored in memory on a first node to memory on a second node for use by a process executing on the second node, the method comprising the following steps:

in response to a page fault generated by the process on the second node in accessing a virtual page of a file, determining that the file page is present in memory on the first node;

allocating a physical page of memory for the file page on the second node;

copying the file page from memory on the first node to the allocated physical page of memory on the second node; and modifying a page table entry for the process to associate the virtual file page with the allocated physical page on the second node.

9. The method of claim 8 wherein the file page is program text executable by the process.

10. The method of claim 8 wherein the determining step comprises examining a data structure stored in memory and associated with the first node, the data structure having fields corresponding to pages of the file.

11. The method of claim 8 wherein the determining step comprises:

examining a first data structure stored in memory and having fields corresponding to the nodes of the computer system to find a second data structure stored in memory which relates to the first node, the second data structure having fields corresponding to pages of the file; and examining the second data structure to determine that the field corresponding to the file page describes a physical memory address for the file page on the first node.

12. A computer readable medium having stored therein instructions for executing the steps of claim 8.

13. A multiprocessor computer comprising:

multiple nodes;

shared memory distributed on the nodes; and a data structure stored in memory and accessible by processes executing on the multiple nodes, the data structure having a field for indicating whether data requested by a process executing on a second node is present on a first node.

14. The multiprocessor computer of claim 13 wherein the data requested is a page of a file, and the data structure includes a field corresponding to each of the pages of a file for describing a physical address for the file page.

15. The system of claim 13 including an operating system stored in memory and operable to perform the following steps in response to a fault generated by a process on a second node in accessing a virtual page of the file:

determining from the data structure that the file page is present in memory on a first node;

allocating a physical page of memory for the file page on the second node;

copying the file page from memory on the first node to the allocated physical page of memory on the second node; and modifying a page table entry for the process to associate the virtual file page with the allocated physical page on the second node.

16. The system of claim 13 wherein the data is program text executable by a process.

17. A multiprocessor computer system comprising:

multiple nodes;

shared memory distributed on the nodes;

a first data structure stored in memory and having fields corresponding to nodes of the computer system to identify second data structures associated with the nodes; and an identified second data structure stored in memory and having a field corresponding to each of the pages of the file for describing a physical address for the file page on the node.

18. The system of claim 17 including an operating system stored in memory and operable in response to a page fault generated by a process on a second node in accessing a virtual page of the file to perform the following steps:

determining that the file page is present in memory on a first node by examining the first and second data structures;

allocating a physical page of memory for the file page on the second node;

copying the file page from memory on the first node to the allocated physical page of memory on the second node; and modifying a page table entry for the process to associate the virtual file page with the allocated physical page on the second node.

19. The system of claim 17 wherein the file pages are program text executable by a process.

20. The system of claim 17 wherein the first and second data structures are accessible to processes executing on any of the nodes of the system.

* * * * *